(No Model.)
A. G. GEKELER.
SEEDER.
No. 502,960. Patented Aug. 8, 1893.
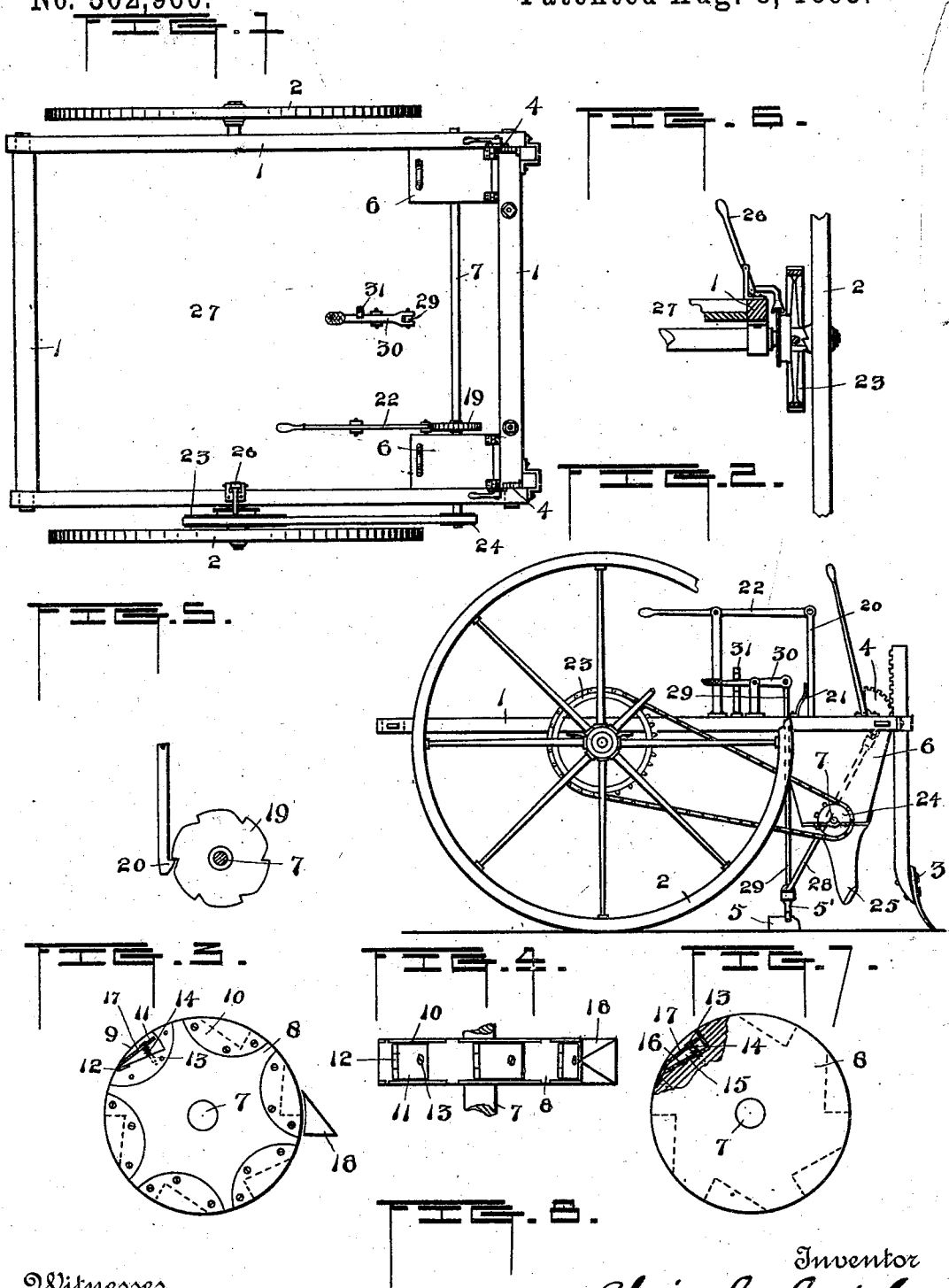
Witnesses
Arch M. Catlin
W. A. Stone
Inventor
Alvin G. Gekeler
by
Benj. R. Catlin Attorney

UNITED STATES PATENT OFFICE.

ALVIN G. GEKELER, OF FROSTBURG, MARYLAND.

SEEDER.

SPECIFICATION forming part of Letters Patent No. 502,960, dated August 8, 1893.

Application filed February 8, 1893. Serial No. 461,492. (No model.)

*To all whom it may concern:*

Be it known that I, ALVIN G. GEKELER, a resident of Frostburg, in the county of Allegany and State of Maryland, have invented certain new and useful Improvements in Seeders; and I do hereby declare the following to be a full, clear, and exact description of the invention, such as will enable others skilled in the art to which it pertains to make and use the same.

The invention relates to machines for planting seed such as corn, beans and the like either in hills or in continuous drills and it has for its object to simplify such devices and at the same time to improve their operation; and it consists in the construction hereinafter described and particularly pointed out.

In the accompanying drawings Figure 1 is a plan of a planter the thills and connected draft devices of usual form being omitted. Fig. 2 is a side elevation of the same. Fig. 3 is an elevation on an enlarged scale of a seeder wheel, a plate being removed to show a spring-held bottom of a seed pocket. Fig. 4 is a plan of the same. Fig. 5 is a side elevation of a detail. Fig. 6 is an enlarged view of a detail. Fig. 7 is a partial sectional view of a modification; and Fig. 8 is a sectional view of covering blades.

Numeral 1 denotes a cart body or frame mounted upon wheels 2. Shovels for opening furrows are denoted by 3 and devices for raising and lowering said shovels are indicated at 4. A furrow closing or seed covering device is denoted by 5 there being one for each shovel. These parts are substantially the same as those described in Patent No. 490,555 granted to me for a potato planter on the 24th day of January, 1893, the present improvements being applicable to the planter shown in said patent.

Seed hoppers are denoted by 6. These may extend below the cart body as shown.

7 indicates a shaft having bearings in the side walls of the hoppers and adapted to turn therein. 8 are seed wheels fixed on said shaft and extend partly through and closely fit slots in the bottoms of the hoppers. The periphery of each wheel which is preferably made of wood is notched at 9 as shown. 10 indicates plates closing these notches at each side and producing seed pockets said plates being set into depressions in the wheels so that their outer faces shall be in the same plane as the surface of the wheels. On their outer edge these plates have the same curvature as a wheel.

11 denotes a plate having two leaves either hinged together or provided if desired with a spring connection at 12. The shorter leaf or plate is sunk in a suitable recess in the bottom of the pocket and properly secured therein by screws or otherwise. The longer leaf constitutes an adjustable floor for the seed pocket and is held between the head of a screw bolt 13 and a spiral spring 14 surrounding the screw between the leaf and the bottom of the notch. The depth of the pocket is adjusted by turning the screw, the leaf being at all times held in a yielding manner and if desired the pockets or a part of them can be covered by raising the adjustable bottom to near the line of the periphery of the wheel and in some cases I contemplate providing said bottom with an outward curve corresponding to that of the periphery. Instead of lining the notches with separate plates such lining may be formed in a simple piece out of sheet steel or other metal. This can be conveniently and cheaply done by stamping. Such construction is indicated in Fig. 7 in which 15 denotes the side plates and 16 the bottom. Such side plates are at such distance apart that their external surfaces coincide with the faces of the wheels.

17 denotes an adjustable spring plate bottom held by a screw bolt 13 and spring 14 such as described the plate being so arranged that it will have a spring pressure at its free end upon the bottom of the pocket. This adjustable spring bottom is not essential in all cases to the use of such pocket stamped out of a single piece.

18 denotes a device for "striking" the filled pockets as they are carried down through the bottom of the hopper by the rotation of a seed wheel. This piece 18 at its bottom is as wide as a pocket but is narrowed toward its upper end and has therefore a wedge like or pyramidal form. Its face next the wheel is curved to conform to the periphery of the wheel. In operation the apex of the pyramid parts the surplus seed adjacent to the open mouth of the descending pocket and its inclined faces throw said seed aside laterally the action being something like that of a cow catcher of a locomotive.

The seed wheels may be operated by a ratchet wheel 19 secured to the shaft 7 through the medium of a pawl 20 held to its work by a spring 21 and operated by a lever 22. Such lever may have its fulcrum in a post erected from the body 1 or floor 27. If it is desired to sow seed continuously in drills the shaft 7 can be driven by connecting wheels 23 and 24 in any suitable manner to drive the seed feeding shaft from the axle of the vehicle or if desired a larger wheel may be substituted for wheel 8 and the seed planted in hills, the lever, pawl and ratchet being dispensed with.

25 denotes a chute preferably attached to the bottom of the hopper and adapted to receive seed when discharged from a wheel pocket and guide it to a furrow.

In Fig. 6 the sprocket wheel 23 is shown as provided with a clutch face adapted to engage a corresponding clutch face on the cart wheel hub. This clutch is engaged or disengaged with the wheel by means of a clutch lever 26 having a suitable fulcrum on the frame 1 and extending for convenience over the cart body floor 27 toward the position of the driver or operator.

The seed coverers 5 shown in Figs. 2 and 8 consist of two plates arranged obliquely with respect to the path of the furrow-opening shovel and adapted to run in the fresh earth thrown up by said shovel and move it or a part of it back over the seed suitably dropped in the furrow.

5′ denotes a yoke or frame to which the covering blades are attached. This is loosely suspended by a pivoted hanger from the front bar of the cart frame.

29 denotes a vertically movable bar whereby the cover can be raised and lowered and 30 is a treadle lever for operating it, 31 indicating notches to hold said lever at any desired elevation.

Having thus fully described my invention, what I claim is—

1. In a seed planter the seed conveying wheel having seed pockets formed by notches extending transversely across the periphery of the same and closed at the sides by plates sunk in the face of the wheel to the level of its surface and having the same curvature as the wheel, substantially as set forth.

2. In a seed planter the seed conveying wheel having seed pockets formed by notches extending transversely across the periphery of the same and closed at the sides by plates sunk in the face of the wheel to the level of its surface and having the same curvature as the wheel, and an adjustable plate secured in the bottom of the pocket, substantially as set forth.

3. In a seed planter the seed wheel provided with notches having in their bottoms hinged plates one of which is secured to the bottom of the notch and a screw bolt and coil spring adapted to adjustably hold the other leaf in a yielding manner, substantially as set forth.

4. The combination of a hopper, the shaft passing through said hopper and suitably journaled in the cart body, the ratchet wheel fast on said shaft, the pawl and lever for operating said ratchet and shaft, and a seed wheel also on said shaft having pockets adapted to convey seed through the floor of the hopper, substantially as set forth.

5. The combination of a hopper, the shaft passing through said hopper and suitably journaled in the cart body, the ratchet wheel fast on said shaft, the pawl and lever for operating said ratchet wheel and shaft and a seed wheel also on said shaft having pockets adapted to convey seed through the floor of the hopper, a gear wheel on said shaft and a gear wheel on the cart shaft whereby seed can be planted in hills or continuously as desired, substantially as set forth.

6. In a seed planter the combination of a hopper, a wheel having pockets, and the stationary approximately pyramidal device having a curved face conforming to the wheel and arranged in its apex near the central plane of said wheel and adapted to throw surplus seed laterally with respect to the wheel, substantially as set forth.

7. In a planting machine the combination of the furrow-opening shovel and the coverers having two approximately vertical blades inclined to each other and situated in planes on opposite sides of the shovel point, the pivoted suspending rods and the adjusting lever extending to a point above the cart frame, all substantially as set forth whereby the coverer can be swung and raised from the ground.

In testimony whereof I have signed this specification in the presence of two subscribing witnesses.

ALVIN G. GEKELER.

Witnesses:
   T. G. PORTER,
   L. F. TAYLOR.